June 20, 1961 C. ULMANN 2,989,304
DEVICE FOR OPERATING AND LOCKING MOVABLE PANELS
Filed Aug. 13, 1958 8 Sheets-Sheet 4
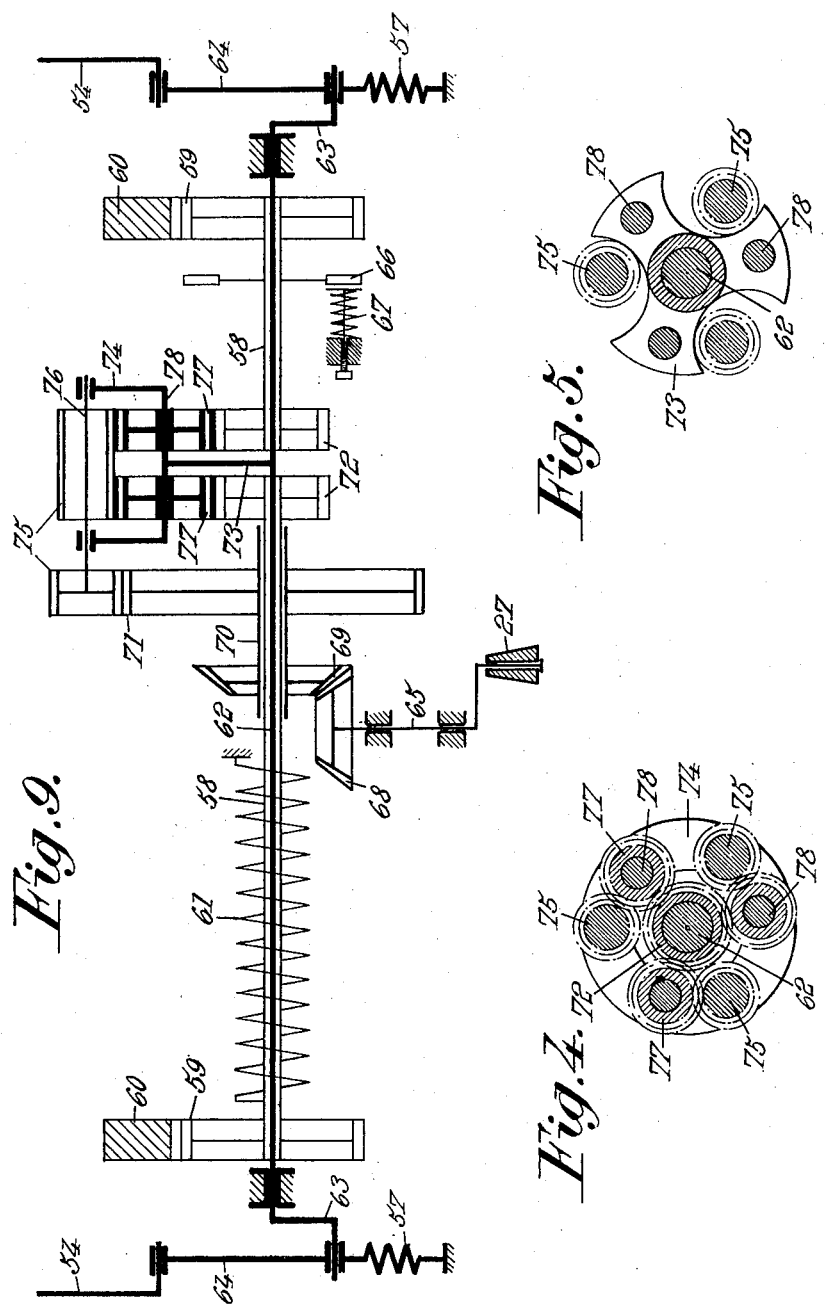

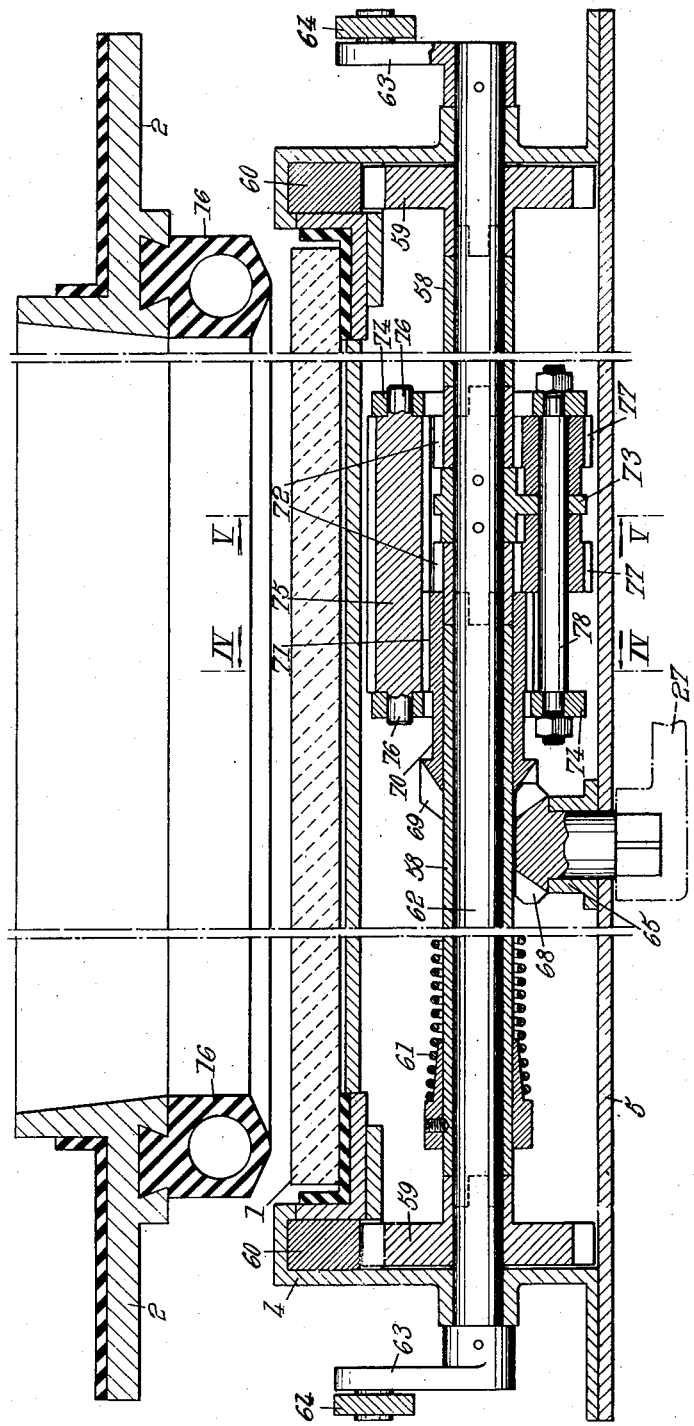

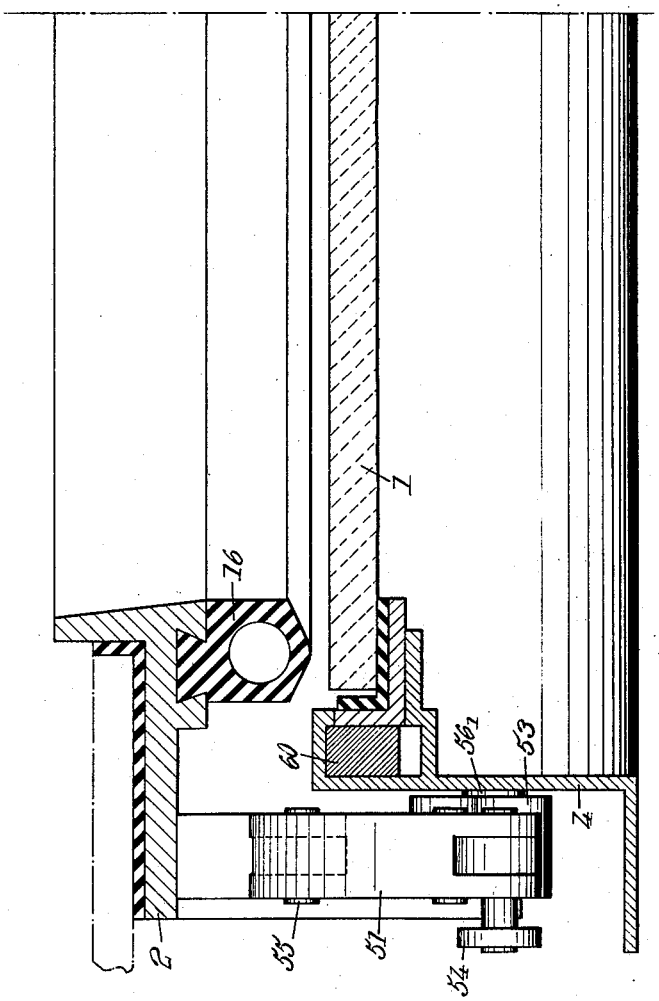

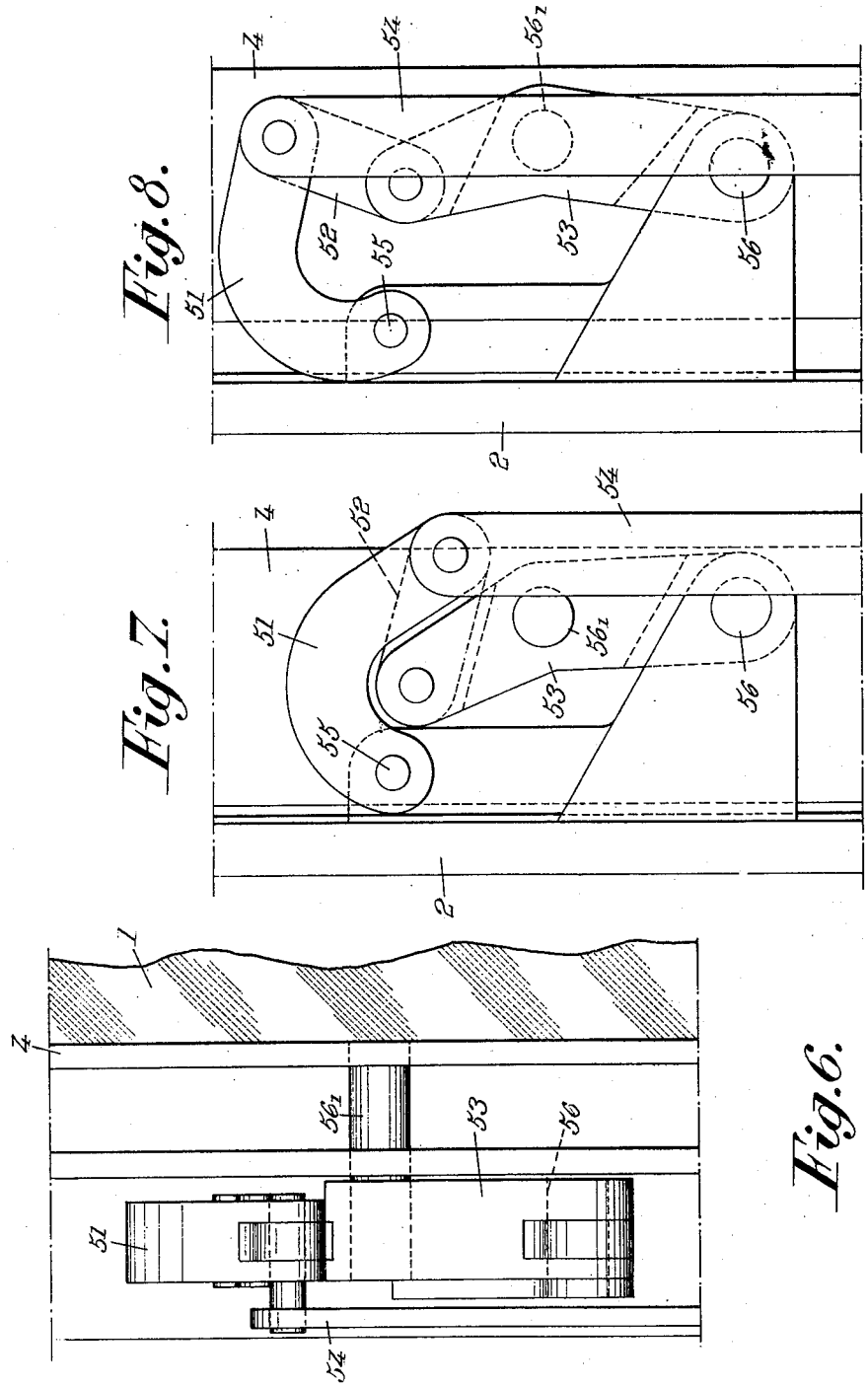

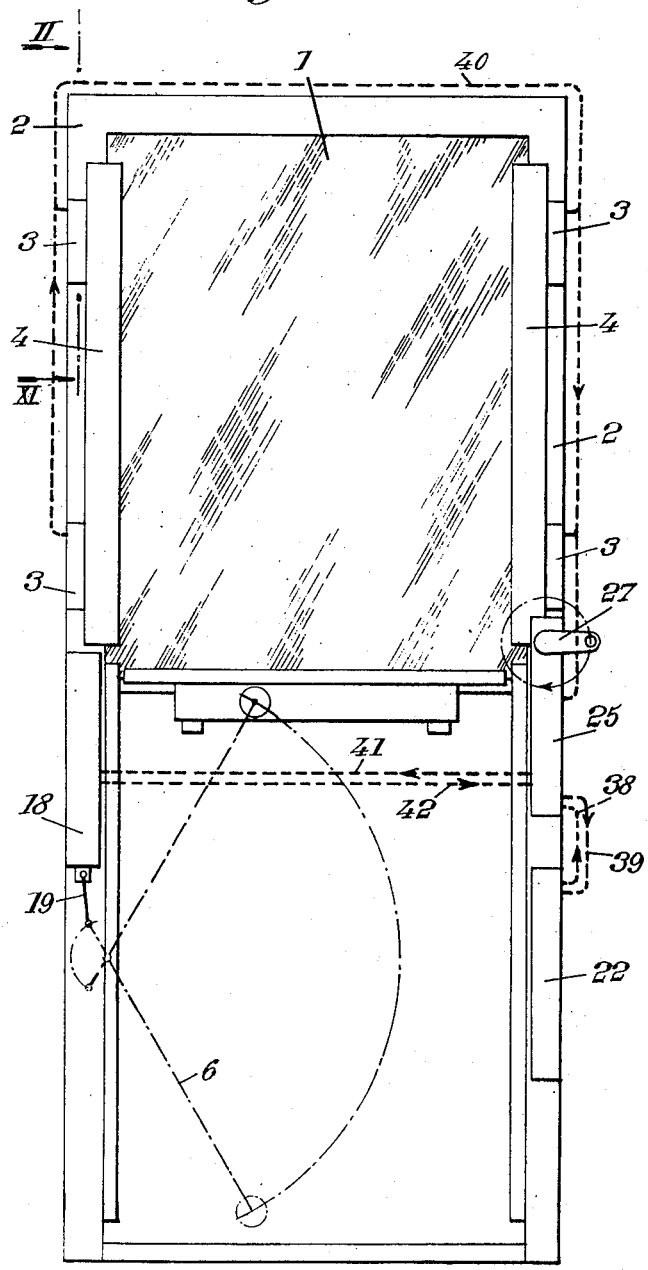

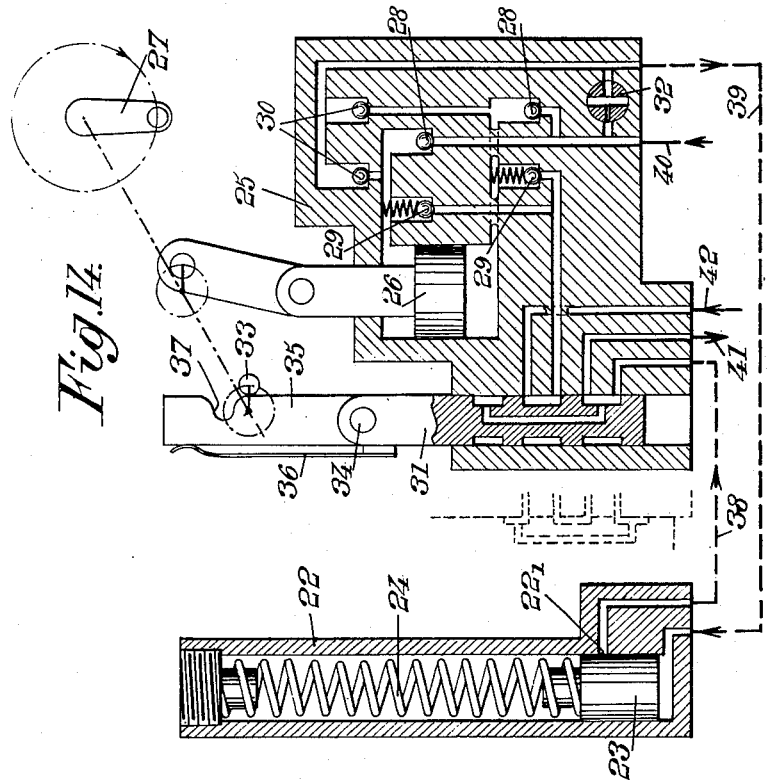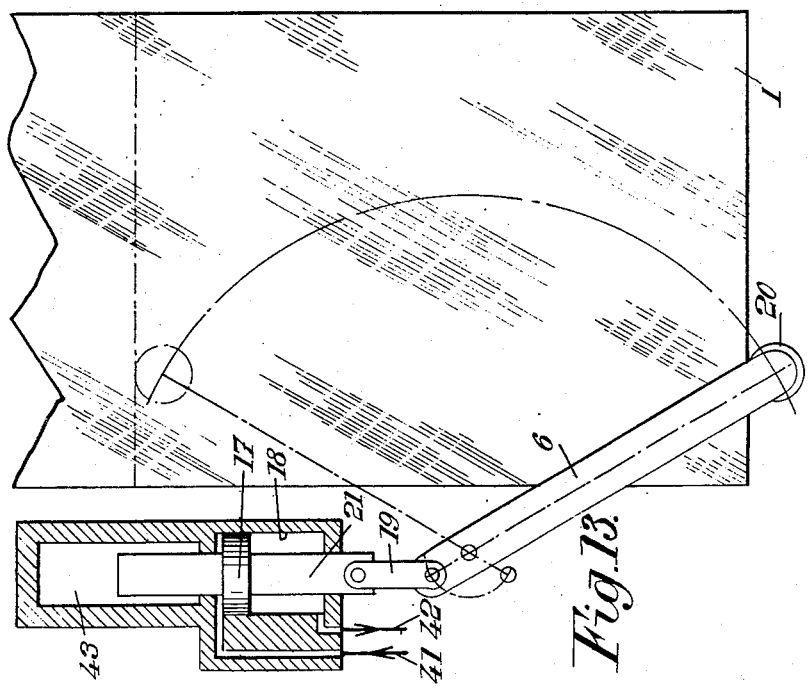

United States Patent Office 2,989,304
Patented June 20, 1961

2,989,304
DEVICE FOR OPERATING AND LOCKING MOVABLE PANELS
Charles Ulmann, Paris, France, assignor to "Etablissements Georges Klein & Cie," Paris, France
Filed Aug. 13, 1958, Ser. No. 754,775
Claims priority, application France Aug. 26, 1957
10 Claims. (Cl. 268—125)

The present invention relates to devices for operating and locking in postion movable panels and in particular sliding glass panes, this locking in position being capable of ensuring the stable and preferably air-tight application of said panels in their supports and guides in any position whatever within the possible range of displacement thereof.

The invention is more especially but not exclusively concerned with devices for operating the glass panes which constitute the windows of vehicles such as railway vehicles and the like.

According to the present invention, this device comprises a crank handle in combination with means operatively connected with said crank handle for successively releasing, moving and relocking the panel in response to a rotation of said crank handle.

Preferred embodiments of the present invention will be hereinafter described with reference to the accompanying drawings, given merely by way of example, and in which:

FIG. 2 is a detailed view on an enlarged scale in horizontal section on the line II—II of FIG. 1.

FIG. 3 is a detailed view on an enlarged scale in horizontal section on the line III—III of FIG. 1.

FIG. 4 is a transverse section on the line IV—IV of FIG. 2.

FIG. 5 is a transverse section on the line V—V of FIG. 2.

FIGS. 6 to 8 are respectively an elevational view and two side views corresponding to two different positions of the locking device.

FIG. 9 is a diagrammatical view illustrating the operation of the device of FIGS. 1 to 8.

FIG. 10 diagrammatically shows in elevational view a window provided with devices made according to another embodiment of the invention.

Figure 11:
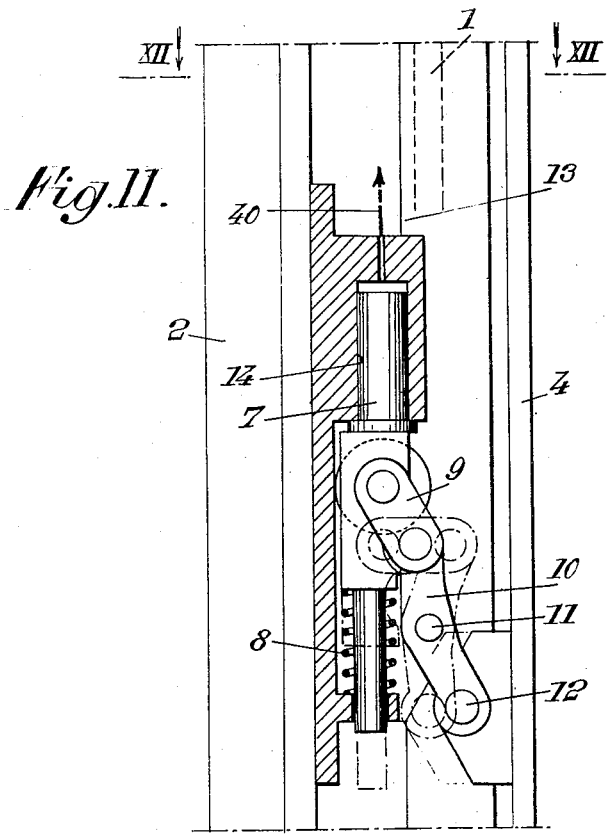

FIG. 11 shows on an enlarged scale, in vertical section on the line XI—XI of FIG. 10, a presser member for use in the device of FIG. 10.

Figure 12:
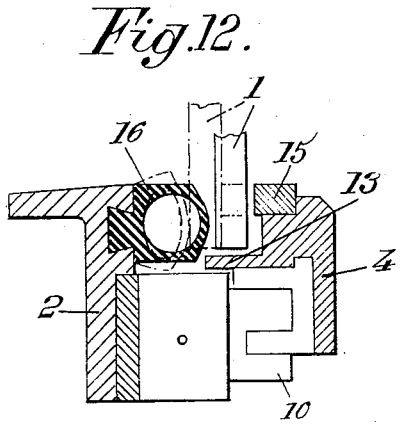

FIG. 12 is a corresponding horizontal section on the line XII—XII of FIG. 11.

FIG. 13 diagrammatically shows the means for controlling the displacements of the glass panes in the construction of FIGS. 10 to 12.

FIG. 14 diagrammatically shows the hydraulic servo-motor means of the device of FIGS. 10 to 13.

The device according to this invention is intended to permit of operating a sliding glass pane 1 by means of a crank handle.

This glass pane is movable across an opening limited by a frame 2 (FIG. 1) against which said glass pane 1 can be applied in position of rest by the action of locking control devices 3 acting upon presser members 4 serving to apply said glass pane 1 against the edges of the window opening of frame 2, said presser members 4 being movable with respect both to said frame 2 and to the cross member 5 which carries a crank handle 27, hereinafter more explicitly referred to. Devices 3 make it possible to stabilize the glass pane in any position thereof wthin its range of displacement and to ensure gastightness in locking position, said glass pane coming, when it is locked under the effect of said presser means, in tight contact with resilient means such as 16 (FIGS. 2 and 3).

The locking control device may be made in different ways and it may be constituted either exclusively by mechanical elements or by hydraulic, electrical or other means.

Figure 1:
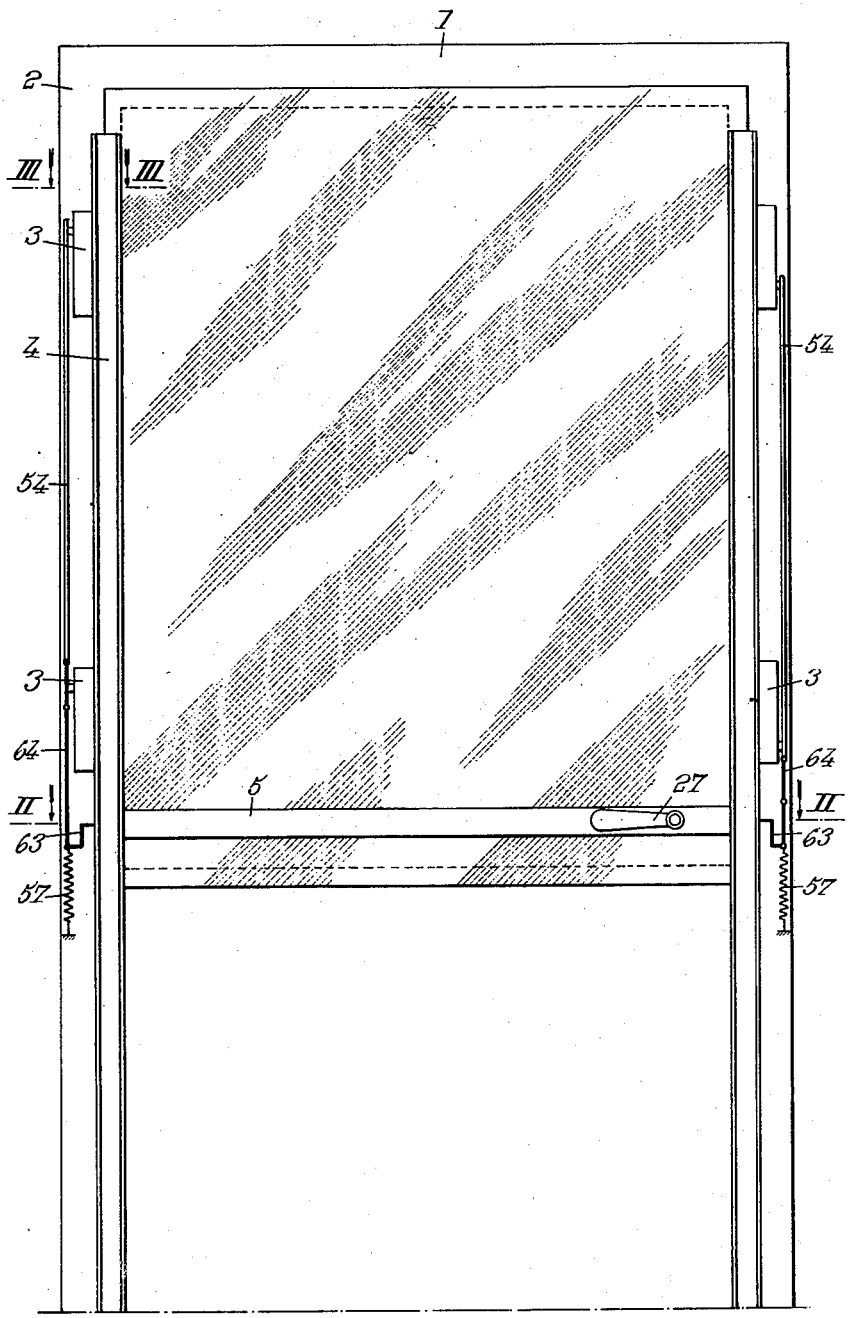
FIG. 1 is a diagrammatic elevational view of a window made according to the present invention.

FIGS. 2 to 8 show a mechanical embodiment of such a device, diagrammatically illustrated at 3 on FIG. 1. According to this embodiment, the device is constituted by a system of levers or links such as 51, 52, 53 capable, when operated by a rod such as 54 of ensuring either, in the locked position (FIG. 7), the movements of presser members 4 toward frame 2 or, in the released position (FIG. 8), their movements away from each other. It will be seen that levers 51 and 53 are pivoted at 55 and 56 respectively to brackets rigid with frame 2. Lever 53 is further pivoted at 56$_1$ to the presser and guiding element 4. Finally in order to achieve an automatic return to locking position, springs such as 57 are provided, the operation of these springs being explained hereinafter.

The crank handle control means making it possible to operate the glass pane when it has been released are arranged in such fashion, according to the invention, that the operation of the crank handle first causes a release of the above mentioned presser means automatically under the resistant effort normally applied to the displacement of the glass pane (or of an effort that is suitably proportioned and obtained through any braking or other means) after which the continuing movement of the crank handle causes the displacement of the glass pane to take place, whereas the release of this crank handle, once the glass pane has reached its new position, produces an immediate or delayed locking of the glass pane in said position, in particular under the effect of resilient means such as the above mentioned springs 57.

In order to comply with these conditions, it seems advantageous to make use of a differential mechanism which is inserted in the means connecting crank handle 27 on the one hand to glass pane 1 and on the other hand to the presser members or their control means that is to say to rods such as 54, these two kinds of elements being adapted to be actuated by the two outputs of the differential mechanism.

In what follows, it will be supposed, by way of example, that the means for controlling the upward or downward movement of the glass pane are of the type including a transverse shaft such as 58 (FIGS. 2 and 9) capable, when it is rotated by the operation of crank handle 27, of ensuring through pinions such as 59 the drive of racks 60 connected with the glass pane, according to a known arrangement, said shaft being located at the level of cross member 5. Means such as springs 61 wound around said shaft are provided for balancing the weight of the glass pane.

Control of the locking or release of the glass pane, that is to say control of rods 54, is ensured (FIGS. 2 and 9) through a shaft 62 coaxial with shaft 58 and for instance disposed therein, shaft 58 being constituted by the assembly of two shaft portions to ensure a differential mechanism mounting. The inner shaft 62 controls at its end rods 54 through crank handles 63 and connecting rods 64.

The above mentioned differential mechanism is inserted between the shaft 65 of crank handle 27 and both of the shafts 58 and 62 so that these two last mentioned shafts constitute the two output shafts of said differential mechanism.

If necessary, that is to say if the frictional forces created by the operation of the glass pane are not sufficient by themselves, there is provided a device (FIG. 9) such as a brake or friction plate 66, the action of which is advantageously adjustable at 67 (for instance by means of a spring), for applying to the control shaft 58 a resistance such that, when the crank handle is rotated, said shaft first remains stationary, whereas on the contrary shaft 62 is being driven until the locking mechanism operated by shaft 62 is at the end of its movement, at which time shaft 58 starts rotating.

The differential mechanism is for instance made as follows (FIGS. 2 and 9):

The shaft 65 of crank handle 27 drives, through pinions 68 and 69, an intermediate shaft 70 carrying a pinion 71 rigid therewith. This pinion 71, on the one hand, and a pair of pinions 72 rigid with the two shaft sections 58, on the other hand (these pinions 71 and 72 constituting sungear means) are made to operate with a planet gear system including supports 73, 74 rigid with shaft 62 and planet wheels 75, 77 carried by said supports.

In the construction illustrated by the drawings, the planet wheels include two sets of pinions, that is to say pinion 71 meshes with a first pinion or set of pinions 75 mounted on spindles 76, this first set of pinions in turn driving a second set of pinions 77 mounted on spindles 78 and in mesh with sun wheels 72.

The whole works as follows:

When crank handle 27 is rotated, the glass pane being supposed to be locked in position, shaft 70 and pinion 71 are caused to rotate. But at this time and according to a suitable adjustment of the friction devices 66, 67, the resistant torque which prevents shaft 58 from rotating is greater than the torque applied to shaft 62 by the reaction of springs 57. Shaft 58 remains stationary whereas shaft 62 is driven by the differential mechanism in the release producing direction.

When the release device comes against its abutment, the resistant torque on shaft 62 increases suddenly and passes to a value such that it is then possible by a slight increase of the effort exerted on crank handle 27, and through the action of gear wheels 71, 75, 77, 72, to rotate the glass pane control shaft 58, which then produces the upward or downward movement of the glass pane through the action of the racks. This displacement is facilitated by the action of compensating spring or springs 61.

When the glass pane has reached the new position it is to occupy and crank handle 27 is released, springs 57, releasing the energy accumulated therein, produce a backward movement of the planets wheel carrier 73 and therefore of shaft 62, thus automatically relocking the mechanism in the new position it occupies.

It should be noted that it is possible, by suitable adjustments of compensating springs 61 and also of friction devices 66, 67, to balance the torques in such manner as to ensure the best possible compromise between the effort to be exerted on the crank handle and the proper operation of the locking means on the one hand and of the glass displacing means on the other hand.

It should also be noted that the hub of crank handle 27 may be provided with means of a known type to lock said hub when no effort is exerted on the crank handle (springbrake means or the like).

Finally, the accumulator springs such as 57 may be provided with any system such as a dash-pot or the like to prevent the relocking operation from taking place too violently.

Of course, the invention is not limited to the use of a differential mechanism and extends to all devices capable of directly permitting the release and the operation of the glass pane from a crank handle or other control member.

In particular, FIGS. 10 to 14 illustrate a system of the same kind but including hydraulic servo-motor means, this system being supposed to be applied as shown by FIG. 10 to a structure of the same kind as that of FIG. 1, the glass pane being operable through arms such as 6.

The presser means 3 are in this case supposed to be hydraulically controlled, the pressure acting on pistons 7 (FIG. 11) constantly urged toward their positions of rest by springs 8 and capable of modifying, through connecting rods 9, the angular position of levers 10 pivoted about axis 11. Each of these levers 10 is pivoted at 12 on one of the presser rods 4 disposed opposite one of the edges of the glass pane 1. Thus, according to the position of pistons 7 in their guiding cylinders 14, presser rods 4 are more or less applied against the corresponding edges of glass pane 1.

In particular, for the position of piston 7 corresponding to the maximum expansion of spring 8, presser rods 4 are kept at a distance from the glass pane so that it is possible to operate said glass pane. This is the glass pane release position (shown in solid lines on FIGS. 11 and 12).

On the contrary, when piston 7 occupies the position corresponding to the maximum compression of spring 8, presser rods 4 apply against the corresponding edges of glass pane 1 an element 15 having a sufficiently smooth external surface to prevent injury of the glass pane and also to act as a guide for said pane. This action has for its effect to apply said element against the resilient member 16. This is the locked position of the glass pane, for which some elements are shown in dot and dash lines on FIGS. 11 and 12.

It should be noted that, in this last mentioned position, connecting rods 9 are substantially perpendicular to the direction of movement of piston 7 or even may have moved beyond this perpendicular position, so that the efforts exerted from the outside on the glass pane, for instance by gusts of wind or sea water, are not transmitted to the piston. The locking action is therefore nonreversible.

Every presser rod 4 may be provided with a projection 13, preferably lined with leather, felt, a plastic material or the like, to ensure the guiding of glass pane 1.

Concerning the operation of the glass pane, it is effected for instance by means of a double action piston 17 (FIG. 13) slidable in a corresponding cylinder 18 under the action of fluid under pressure (controlled through crank handle 27 and in the manner hereinafter indicated), this piston being connected through a rod 19 with one end of the balancing arm 6 the other end of which supports glass pane 1 through roller 20. According to the position of piston 17 in cylinder 18, the glass pane is more or less lifted and it will be for instance closed when said piston is in its lowermost position.

The total volume available for the fluid on both sides of piston 17 is constantly kept of the same value, for instance by constituting said piston by a disc mounted on a cylindrical rod 21 slidable in a fluidtight fashion through the two end walls of cylinder 18.

In order to ensure the successive release and relocking of the glass pane, it is necessary first to suck in the volume of fluid contained in cylinders 14, then to send it through a closed circuit on one of the faces of piston 17 so as to displace this piston 17, and therefore glass pane 1, and finally to send it back into cylinders 14.

For this purpose and through the same continuous pumping movement, said volume is first drawn into an accumulator 22 containing a piston 23 subjected to the action of a spring 24 (FIG. 14) to push back said piston 23 until it opens a discharge orifice $22_1$, which permits the above mentioned circulation through a closed circuit. The expansion of spring 24 which follows a stopping of the pumping action returns said volume into cylinders 14 and achieves the locking of glass pane 1 in a gastight relation to its frame.

In order to perform this continuous pumping movement from crank handle 27, use is made of a system constituted by a body 25 (FIG. 14), a double action piston 26 actuated by said crank handle 27, two free suction valves 28, two spring loaded suction valves 29, two delivery valves 30, a distributing slide valve 31 and a switching device 32.

In order to have the position of distributing slide valve 31 dependent only upon the direction of rotation of crank handle 27, said crank handle is operatively connected with a finger 33 and an element 35 is pivoted at 34 on slide valve 31, these elements 35 being constantly urged by a spring 36 toward a position of rest where it is for instance in line with slide valve 31 (FIG. 14). A notch 37 provided in element 35 is adapted to house said finger in certain conditions.

It should be understood that in the conditions illustrated by FIG. 14, slide valve 31 is brought into its upper position when the crank handle rotates in the clockwise direction and as soon as this handle has rotated through at most one complete revolution, finger 33 engaging into notch 37 when it describes the lower portion of its first circular trajectory, then lifting element 35 and therefore slide valve 31 when it describes the left hand portion of said trajectory, and finally escaping from said notch at the end of this upward movement. Likewise, it will be located in its lowest position as soon as the crank handle has rotated through at most one complete revolution in the anti-clockwise direction.

The distributing chambers of slide valve 31 and the conduits opening opposite said chambers are of course arranged in such manner that the circulation of the fluid under pressure in a closed circuit as above mentioned has for its effect to lower piston 17 and therefore to lift glass pane 1 for one of the direction of rotation of the crank handle and on the contrary to move piston 17 upwardly and therefore to lower glass pane 1 for the other direction of rotation of the crank handle.

The switching device 32 permits at will, either of placing in direct communication with each other the free suction valves 28 and the delivery valve 30 of the pump, which neutralizes the pump as it is necessary when it is desired to prevent the operation of the glass pane, or to interpose between said valves throttling means the function of which will be hereinafter set forth.

Pump 25, which comprises in a general manner all the pumping control and distribution parts designated by reference numerals 25 to 37, is connected respectively:

To accumulator 22 through pipes 38 and 39 (FIGS. 10 and 14);

To the cylinders 14 of the presser devices 3 through pipe 40 (FIGS. 10, 11 and 14); and To the cylinder 18 of the glass pane operating device through pipes 41 and 42 (FIGS. 10, 11 and 14).

The operation of the system is as follows:

It is supposed that initially glass pane 1 is in its opened position and that crank handle 27 is actuated in the direction indicated by the arrow (all the arrows shown on the drawing corresponding to a rotation of crank handle 27 in said direction).

As above explained, slide valve 31 comes into its upper position (FIG. 14).

At the beginning of the pumping action, the volume of fluid (which will be hereinafter supposed to be constituted of a non-compressible liquid) contained in cylinders 14 to lock glass pane 1 in position is sucked in through pipe 40 and free suction valves 28, which releases glass pane 1, this fluid being delivered past valves 30 and through conduit 39 to accumulator 22, where it pushes back piston 23.

When piston 23 has moved a sufficient distance while compressing spring 24, it opens orifice $22_1$ and the liquid under pressure is then driven, if the operator keeps pumping, to the upper face of piston 17 through pipes 38 and 41. Said piston 17 is therefore pushed back downwardly which causes glass pane 1 to be lifted. The liquid contained in the lower portion of cylinder 18 is driven off through conduit 42 toward the spring loaded valves 29, then toward valves 30, accumulator 22 and once more said upper face.

The glass therefore keeps moving upwardly as long as the pumping action, that is to say the rotation of crank handle 27, is pursued.

As soon as this movement ceases, liquid no longer opposes its dynamic pressure to the static pressure of spring 24. This spring therefore expands and causes piston 23 to close orifice $22_1$. Any liquid circulation through conduits 38, 41 and 42 is stopped and the volume of liquid (oil) stored up initially is gradually returned through conduits 39 and 40 and the throttled passage of device 32 toward cylinders 14. The glass pane is thus automatically locked in its new position.

The operation of crank handle 27 in the opposed direction causes successively and in the same manner as above described, the release, downward movement and a new locking of glass pane 1, slide valve 31 being then in a position such as that shown in dotted lines in FIG. 14.

The throttled passage of device 32 permits both of avoiding neutralization of the pump and of returning the liquid to the presser elements without any displacements of the parts.

The arrangement above described concerning the cylindrical shape of rod 21 permits of maintaining the total volume of the liquid subjected to the thrust of the pump at a constant value, which avoids any risk of undesirable over-pressure or under-pressure of this liquid.

According to another advantageous feature of the invention, the weight of the glass pane 1 is at least partly balanced by the action of a compressed fluid cushion.

In particular, it is advantageous to cause the pressure of the gas contained in a chamber 43 (FIG. 13) to act upon the end of rod 31 opposed to that pivotally connected with rod 19.

In a general manner, while I have, in the above description, disclosed what I deem to be practical an efficient embodiment of my invention, it should be well understood that I do not wish to be limited thereto as there might be changes made in the arrangement, disposition and form of the parts without departing from the principle of the present invention as comprehended within the scope of the accompanying claims.

What I claim is:

1. A device for operating a pane slidable along the vertical frame of a window opening which comprises, in combination, a first mechanism for moving said pane transversely thereto with respect to said frame whereby said pane can be either locked against said frame or released therefrom, a second mechanism for moving said pane in its own plane vertically with respect to said frame, a manually actuated crank handle for operating said pane, a differential gear interposed between said crank handle and said mechanisms respectively, the resistance to vertical movements of said pane causing, initially, only said first mechanism to be actuated by said crank handle to release said pane, said second mechanism being actuated when said first mechanism has been completely operated, and resilient means for automatically returning said first mechanism into pane locking position upon release of said handle.

2. A device according to claim 1 further including frictional means for yielding by opposing vertical displacements of said pane.

3. A device according to claim 1 in which said two mechanisms include each a horizontal shaft parallel to said pane, the output elements of said differential gear being operatively connected with said shafts respectively.

4. A device according to claim 3 in which said two shafts are coaxially located, one inside the other.

5. A device for operating a pane slidable along the vertical frame of a window opening which comprises, in combination, a first mechanism for moving said pane transversely thereto with respect to said frame whereby said pane can be either locked against said frame or released therefrom, a second mechanism for moving said pane in its own plane vertically with respect to said frame, a manually actuated crank handle for operating said pane, a hydraulic servo-motor interposed between said crank handle and said mechanisms respectively, said servo-motor being adapted to actuate said second mechanism only after said first mechanism has been completely actuated into the pane releasing position, and resilient means for automatically returning said first mechanism into pane locking position upon release of said crank handle.

6. A device according to claim 5 in which said last mentioned means is constituted by a pressure accumulator.

7. A device according to claim 5 in which said last mentioned means is constituted by a pressure accumulator, said accumulator being further arranged to work as distributing means to prevent operation of said second mechanism as long as said first mechanism has not been completely actuated into pane locking position.

8. A device according to claim 5 further including means for throttling the liquid circulation in the direction corresponding to the locking of said pane.

9. A device according to claim 5 further including slide valve means operatively connected with said crank handle for adapting the direction of liquid circulation to the direction of rotation of said crank handle.

10. For use in a structure including a frame forming a window opening, and a vertical pane slidably guided in said frame, so as to be able to slide vertically with respect thereto, said pane being movable with a small amplitude of displacement in a direction transverse to its plane, a device for operating said pane which comprises, in combination, presser means movably carried by said frame for displacement transversely to the plane thereof, said presser means being located on the other side of said pane from said frame and being adapted to cooperate with said pane so that said pane can be applied against said frame by a transverse displacement of said presser means in the direction toward said frame, resilient means mounted to act in this transverse direction on said presser means for holding said pane applied against said frame, a crank handle, means operative by said crank handle in response to a minimum torque applied thereto in either direction for moving said presser means in a transverse direction opposed to the above mentioned one, against the action of said resilient means and means, operative by said crank handle in response to a stronger torque applied thereto in either direction, for sliding said pane vertically in said frame, upwardly for one direction of rotation of said crank handle and downwardly for the other direction and with an amplitude proportional to the rotation of said crank handle, said resilient means being arranged to push back said presser means in the first mentioned direction as soon as a torque ceases to be applied to said crank handle.

References Cited in the file of this patent
UNITED STATES PATENTS 2,409,007    Young _____ Oct. 8, 1946